United States Patent
Sogabe et al.

[11] Patent Number: 5,977,820
[45] Date of Patent: Nov. 2, 1999

[54] PHASE ESTIMATING CIRCUIT AND DEMODULATING CIRCUIT

[75] Inventors: Yasushi Sogabe; Fumio Ishizu; Keishi Murakami, all of Tokyo, Japan

[73] Assignee: Mitsubishi Denki Kabushiki Kaisha, Tokyo, Japan

[21] Appl. No.: 09/047,416

[22] Filed: Mar. 25, 1998

[30] Foreign Application Priority Data

Sep. 19, 1997 [JP] Japan ..................................... 9-255647

[51] Int. Cl.⁶ ............................ H03D 3/00; H04L 27/22; H04L 27/38
[52] U.S. Cl. .......................... 329/306; 329/310; 375/329; 375/324
[58] Field of Search .................................. 329/304–310; 375/324, 329, 344, 373, 376

[56] References Cited

U.S. PATENT DOCUMENTS

| | | | |
|---|---|---|---|
| 5,228,025 | 7/1993 | Le Floch et al. ......................... | 370/20 |
| 5,657,355 | 8/1997 | Reusens ................................... | 375/340 |
| 5,870,438 | 2/1999 | Olafsson ................................. | 375/344 |

FOREIGN PATENT DOCUMENTS 6-232933  8/1994  Japan .

Primary Examiner—David Mis

[57] ABSTRACT

The presence or absence of a clock component is detected for an input signal. If the input signal does not comprise a clock component, the operation of a computing circuit is halted, thereby further improving the accuracy of phase estimation. A signal generating circuit produces a twiddle factor for DFT. A DFT circuit performs discrete Fourier transform on an input signal for a predetermined number of symbols based on the twiddle factor for DFT. A pattern detecting circuit examines the input signal for its pattern based on the output from the DFT circuit. An averaging filter turns on or off the operation of the subsequent averaging filter according to the detected pattern, and averages the outputs from the DFT circuit to remove a noise component.

16 Claims, 12 Drawing Sheets

PHASE ESTIMATING CIRCUIT AND DEMODULATING CIRCUIT

BACKGROUND OF THE INVENTION a) Field of the Invention

The invention relates to clock recovery by a demodulator in a data communication system.

b) Description of the Related Art

A conventional clock recovery circuit to recovers a clock by determining a phase component of an input signal's clock by Fourier transformation and performing a reverse modulation of the determined phase component. FIG. 12 shows an example of configuration of a conventional clock recovery circuit, which is disclosed in, for example, Japanese Patent Laid-Open Publication No. Hei 6-232933, "Clock Recovery Circuit". In FIG. 12, reference numeral 101 denotes an input terminal, 103 and 104 multipliers for multiplying an input signal by a twiddle factor (cos or −sin component) for the Fourier transform, 105 and 106 low pass filters for averaging outputs from the multiplier 103 or 104, 107 a multiplier for multiplying output from the low pass filter 105 by a twiddle factor, 108 a multiplier for multiplying output from the low pass filter 106 by a twiddle factor, 109 an adder for adding outputs from the multiplier 107 and the multiplier 108, 110 is a signal generating circuit for preparing a twiddle factor, and 111 indicates an output terminal for a recovered clock output from the adder 109.

The operation of a known method will be described with reference to FIG. 12. To simplify description, the number of samples per symbol will be defined as N=4, and the Fourier transform referred to in this specification is the discrete Fourier transform (hereinafter called "DFT", including FFT). The input signal entered into the clock recovery circuit is a signal prepared by having a received signal undergo non-linear processing to facilitate the extraction of a clock component.

The multiplier 103 and the multiplier 104 multiply an input signal by a twiddle factor. As the twiddle factor, the multiplier 103 uses cos component, while the multiplier 104 uses −sin component. Assuming that the number of samples per symbol of the input signal is N, the cos and −sin components output from the signal generating circuit 110 are given by the respective following equations (1) and (2).

$$\cos(2\pi n/N) \text{ (where } n=0, 1, 2, \ldots) \quad (1)$$

$$-\sin(2\pi n/N) \text{ (where } n=0, 1, 2, \ldots) \quad (2)$$

Then, assuming that the input signal is expressed as follows:

$$X(n) \quad (3)$$

output $X_1(n)$ from the multiplier 103 and output $X_2(n)$ from the multiplier 104 are expressed by the following equations (4) and (5), respectively.

$$X_1(n) = X(n) \cdot \cos(2\pi n/N) \quad (4)$$

$$X_2(n) = X(n) \cdot (-\sin(2\pi n/N)) \quad (5)$$

And, the following equation (6) is applied to the equations (4) and (5) to obtain the following equations (7) and (8):

$$N = 4 \quad (6)$$

$$X_1(n) = (-1)^{n/2} \cdot X(n) \quad \text{(where } n \text{ is an even number)} \quad (7)$$
$$\phantom{X_1(n)} = 0 \quad \text{(where } n \text{ is an odd number)}$$

$$X_2(n) = 0 \quad \text{(where } n \text{ is an even number)} \quad (8)$$
$$\phantom{X_2(n)} = (-1)^{(n-1)/2+1} \cdot X(n) \quad \text{(where } n \text{ is an odd number)}$$

The low pass filter 105 and the low pass filter 106 average the output from the multiplier 103 and the output from the multiplier 104 respectively to remove noise components.

The conventional DFT performs processing on a single sample basis to simplify a processing structure, namely a hardware structure, and does not perform processing on a symbol basis.

The multiplier 107 multiplies the output from the low pass filter 105 by the cos component, and the multiplier 108 multiplies the output from the low pass filter 106 by the −sin component. The adder 109 adds the output from the multiplier 107 and that from the multiplier 108 to prepare a recovered clock. When it is assumed that N=4, the cos component and the −sin component with respect to a single symbol are given as follows:

$$\{1, 0, -1, 0\} \quad (9)$$

$$\{0, -1, 0, 1\} \quad (10)$$

The output from the adder is obtained by alternately selecting the output from the multiplier 107 and that from the multiplier 108 and adding a code of the input signal in compliance with a code of the twiddle factor.

Accordingly, when it is assumed that the output from the low pass filter 105 is $Y_1(n)$ and that from the low pass filter 106 is $Y_2(n)$, the recovered clock may have a sequence such as:

$$\{Y_1(n), -Y_2(n+1), -Y_1(n+2), Y_2(n+3), Y_1(n+4), -Y_2(n+5), \ldots\}.$$

Since the low pass filter is an averaging filter, it is necessary to increase the number of averaging symbols in order to improve the accuracy of the recovered clock. However, when the number of averaging symbols is increased, the number of bits also increases, and circuit scale is enlarged. Therefore, generally when averaging, either a moving average is performed as shown in FIG. 13 or a forgetting factor is multiplied while cumulative adding as shown in FIG. 14 to prevent the circuit scale from becoming large. If the input signal does not have a clock component, the input value of the low pass filter becomes $\{0, 0\}$, the output value from the low pass filter becomes small, and an estimated clock phase tends to be affected by noise.

SUMMARY OF THE INVENTION

The present invention addresses the drawbacks described above and aims to improve the accuracy of phase estimation by performing DFT on a desired symbol basis and passing the obtained result through a noise removing filter. The present invention also aims to improve the estimated phase accuracy of the clock by detecting the presence or absence of a clock component in the input signal by a pattern detecting circuit, and if the clock component is not present, halting the operation of the filter. Energy of the clock component is also monitored to further improve the estimated phase accuracy of the clock. The recovered clock for the input signal is therefore prepared with higher accuracy.

The phase estimating circuit according to a first aspect of the present invention comprises a signal generating circuit for generating a signal of a twiddle factor for discrete Fourier transform of cos component and −sin component; a DFT circuit for performing the discrete Fourier transform for only a predetermined number of symbols using the signal of the twiddle factor for the discrete Fourier transform and outputting the transformed result; and an averaging filter for averaging the results of the discrete Fourier transform outputted from the DFT circuit to output the averaged phase information.

The phase estimating circuit according to a second aspect of the present invention includes a pattern detecting circuit, which stops the operation of the averaging filter when the result of the discrete Fourier transform being outputted from the DFT circuit conforms to a predetermined pattern.

The phase estimation circuit according to a third aspect of the present invention includes a phase detecting circuit which determines a phase of the clock component of the input signal up to the previous symbol in view of the output from the averaging filter and outputs the obtained result as phase information to the pattern detecting circuit, wherein the pattern detecting circuit stops the operation of the averaging filter according to the results of the discrete Fourier transform performed by the DFT circuit and the phase information from the phase detecting circuit.

The phase estimating circuit according to a fourth aspect of the invention includes an energy monitor, which determines energy of the clock component in view of the output from the averaging filter, compares the determined energy with a predetermined threshold, and outputs the compared result. In this circuit, the pattern detecting circuit stops the operation of the averaging filter according to the output resulting from the discrete Fourier transform performed by the DFT circuit and the output from the energy monitor.

The demodulating circuit according to a fifth aspect of the invention includes a phase estimating circuit; an inverse modulating circuit which generates a recovered clock based on the phase information output from the phase estimating circuit and a twiddle factor for the discrete Fourier transform output from the signal generating circuit; and a decision circuit which judges the input signal for data using the recovered clock.

The demodulating circuit according to a sixth aspect of the invention includes a decimation circuit which decimates phase information output from a phase estimating circuit and data of the input signal and outputs demodulation data.

DETAILED DESCRIPTION OF THE PREFERRED EMBODIMENTS

Embodiment 1

Similar to the case described above for the related art the Fourier transform in this example is also DFT, and the number of samples per symbol is defined as N=4. Generally, as an input signal of a clock recovery circuit, a received signal is subjected to non-linear processing to facilitate the extraction of a clock component. However, the presence or absence of a non-linear processing circuit does not affect the invention to be described. Therefore, the non-linear processing circuit will not be described and the term "input signal" will be used. A noise reduction filter to be used is generally an averaging filter and, therefore, the term "averaging filter" will be used in the following embodiments.

Figure 1:
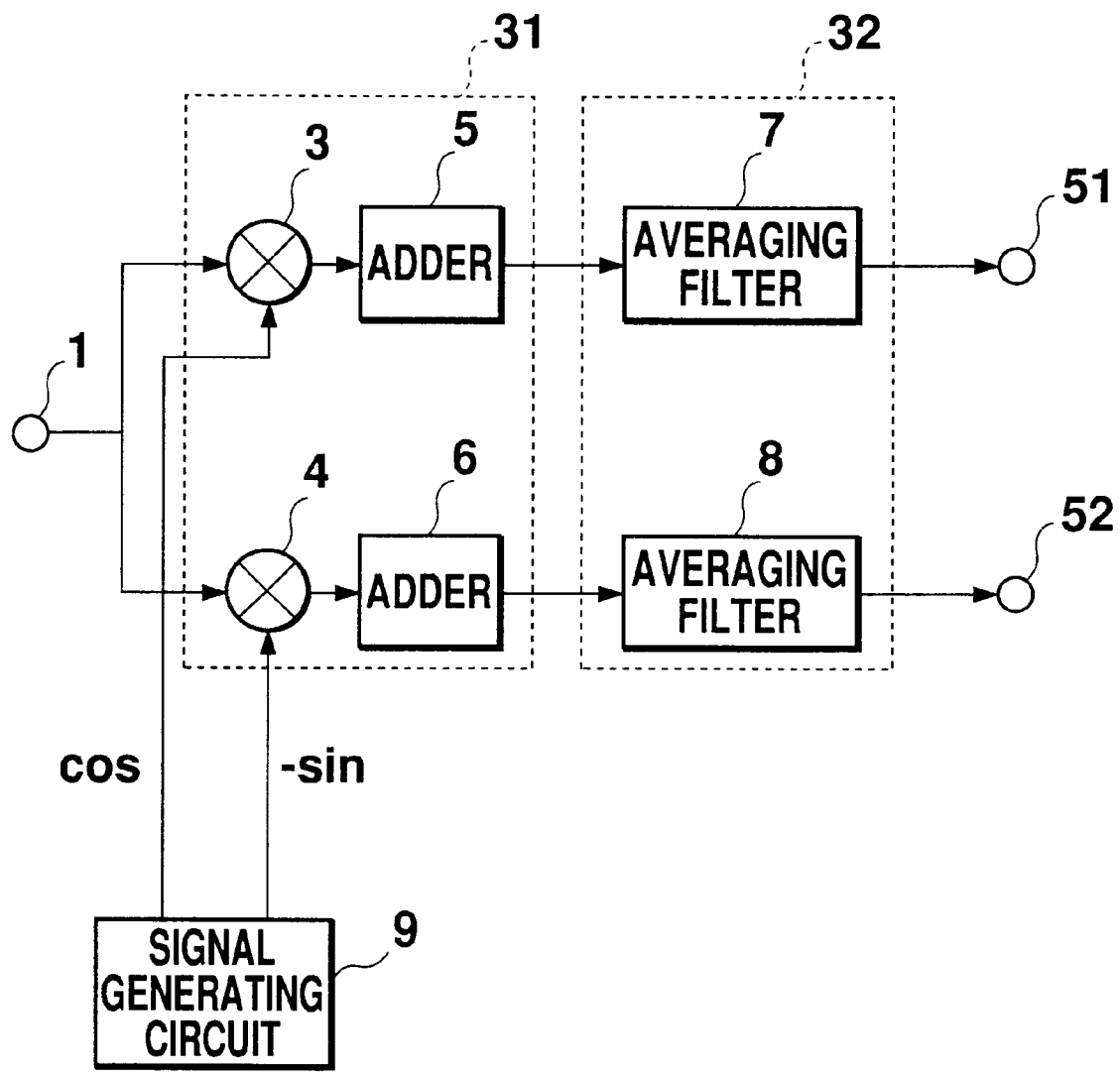
FIG. 1 is a block diagram showing a phase estimating circuit according to a first embodiment of the invention.
Figure 2:
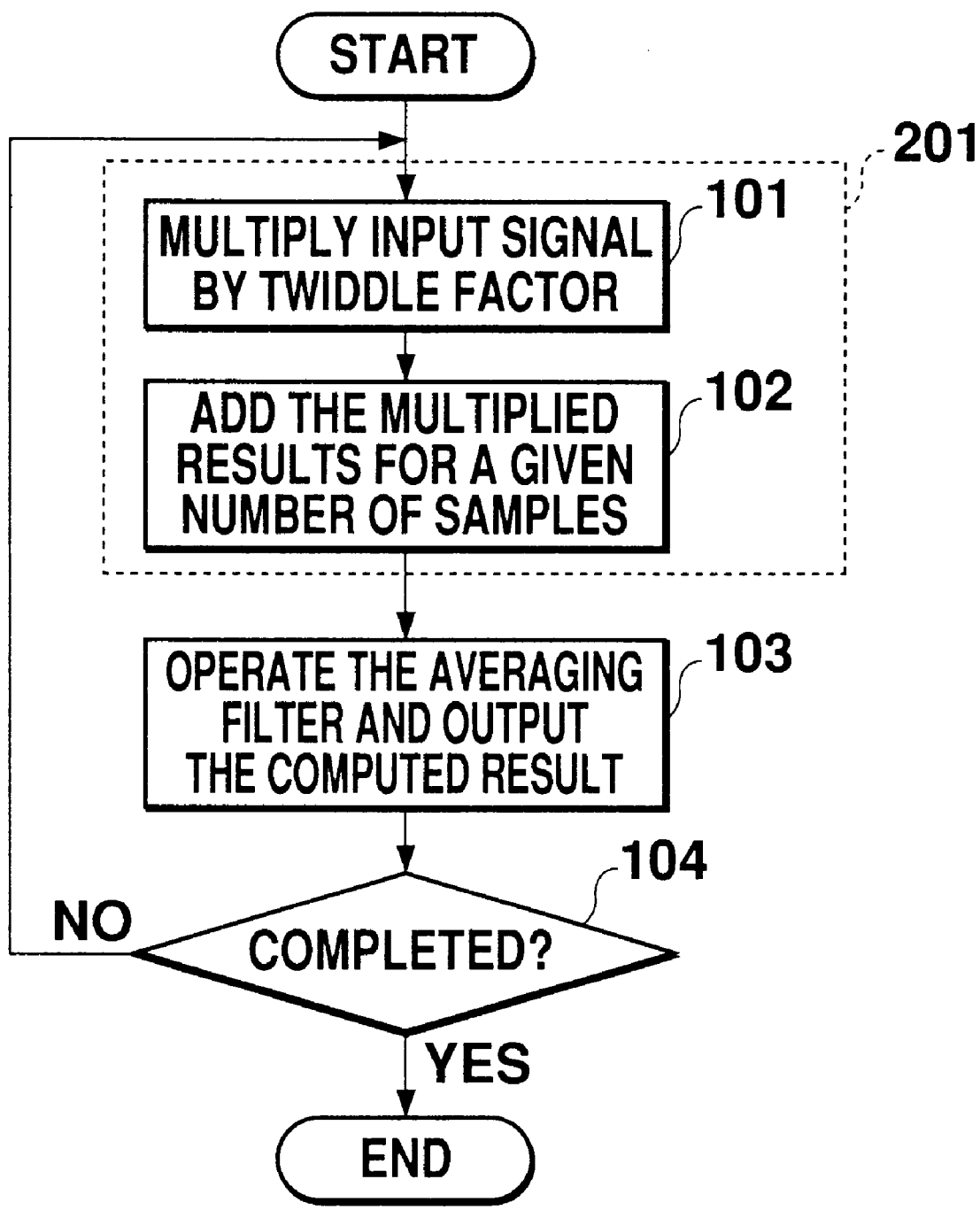
FIG. 2 is a flowchart showing the operation of the phase estimating circuit according to the first embodiment of the invention.

FIG. 1 is a block diagram showing a phase estimating circuit of the first embodiment of the invention. FIG. 2 is a flowchart showing the operation of the phase estimating circuit of the first aspect of the invention. In FIG. 1, reference numeral 1 denotes an input terminal; 3, 4 multipliers for multiplying an input signal by a twiddle factor for DFT; 5, 6 adders for adding the outputs from the multipliers 3, 4 for a predetermined number of samples; 7, 8 denote averaging filters for averaging the outputs from the adders; 9 a signal generating circuit for preparing a twiddle factor; and 51, 52 output terminals of the averaging filters 7, 8. Reference numeral 31 denotes a DFT circuit, which comprises the multiplier 3, the multiplier 4, the adder 5, and the adder 6. Reference numeral 32 denotes an averaging filter, which comprises the averaging filter 7 and the averaging filter 8.

Operation will next be described with reference to FIG. 1 and FIG. 2. In FIG. 1, the multiplier 3 and the multiplier 4 multiply an input signal by a twiddle factor outputted from the signal generating circuit 9 (step 101 in FIG. 2). In a manner corresponding to that of the conventional art, it is assumed that the number of samples per symbol of the input signal is 4, the input signal is X(n), the outputs from the multiplier 3 and the multiplier 4 are $X_1(n)$ and $X_2(n)$. Then, the equations (11), (12) are obtained in the same way as the equations (7) and (8).

$$X_1(n) = (-1)^{n/2} \cdot X(n) \quad \text{(where } n \text{ is an even number)} \tag{11}$$
$$= 0 \quad \text{(where } n \text{ is an odd number)}$$

-continued $$X_2(n) = 0 \quad \text{(where } n \text{ is an even number)} \tag{12}$$
$$= (-1)^{(n-1)/2+1} \cdot X(n) \text{ (where } n \text{ is an odd number)}$$

The adders 5, 6 add up the outputs from the multiplier 3 and the multiplier 4 for a predetermined number of samples (step 102 in FIG. 2). To keep description simple, in this description the adders 5, 6 add up the multiplied results of a single symbol (four samples) and output the added results in a symbol cycle. Also, the processing in which the input signal is multiplied by the twiddle factor and the multiplied results are added up, will be referred to as DFT, and the term one-symbol DFT will be used to refer to DFT performed on a single symbol.

The input signal is assumed to be a signal having a clock component. Since N is defined as 4, the input signal is assumed to be, for example, a repetition signal of $\{1, 1, -1, -1\}$. Where the one-symbol DFT is performed on this input signal, cos component and −sin component are given by the respective following expressions (9), (10):

$$\{1, 0, -1, 0\} \tag{13}$$

$$\{0, -1, 0, 1\} \tag{14}$$

The results of the one-symbol DFT (outputs from the adders 5, 6) are given by the following expression (15).

$$\{2, -2\} \tag{15}$$

The averaging filter 7 and the averaging filter 8 average the results of the one-symbol DFT to remove noise components. However, since the one-symbol DFT outputs the result on a single symbol basis, the averaging filters 7, 8 operate at a symbol rate. Where the averaging filters 7, 8 comprise a moving average filter for S symbols, their outputs are given by the expression (16).

$$\{2S, -2S\} \tag{16}$$

The output terminal 51 and the output terminal 52 output as phase information the averaging filter output given by the expression (16) (step 103 in FIG. 2).

As described above, the phase estimating circuit performs DFT on a given symbol basis and passes the results through the averaging filter, so that the accuracy of estimating a phase can be improved.

DFT was performed on a single symbol basis in the embodiment described above but may also be performed in units of several symbols.

Although, the input signal had three amplitudes, −1, 0 and 1, the number of quantizing bits of the amplitude may be increased.

Embodiment 2

Figure 3:
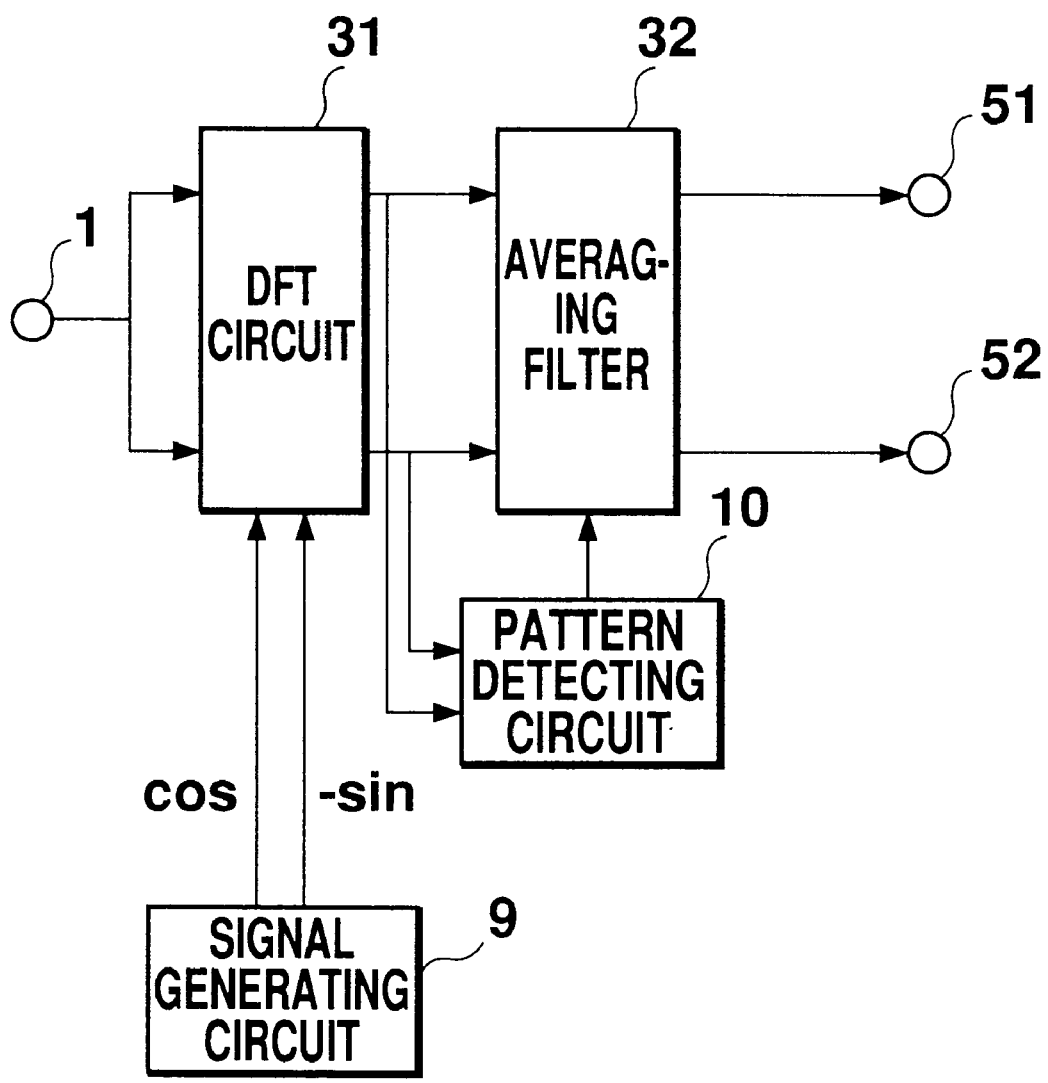
FIG. 3 is a block diagram showing a phase estimating circuit according to a second embodiment of the invention.
Figure 4:
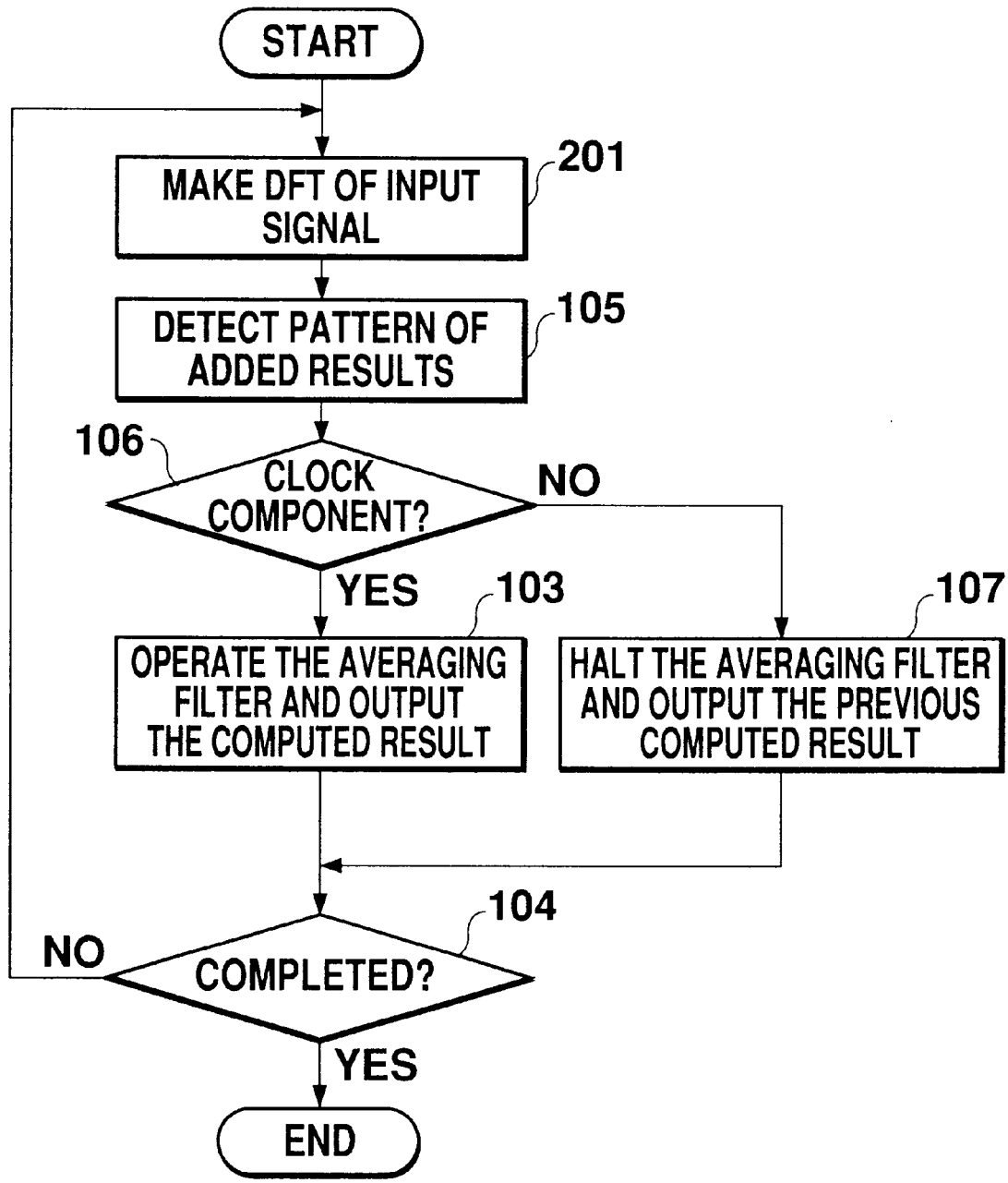
FIG. 4 is a flowchart showing the operation of the phase estimating circuit according to the second embodiment of the invention.

FIG. 3 is a block diagram showing a phase estimating circuit according to a second aspect of the present invention. FIG. 4 is a flowchart showing the operation of the phase estimating circuit according to the second aspect of the invention. In FIG. 3, reference numeral 10 denotes a pattern detecting circuit which stops the operation of an averaging filter 32 if a desired pattern is detected in the output from a DFT circuit 31. An input terminal 1, a signal generating circuit 9, the DFT circuit 31, the averaging circuit 32, an output terminal 51, and an output terminal 52 correspond to those in the first embodiment and their description will not be repeated.

The operation will next be described with reference to FIG. 3 and FIG. 4.

The DFT circuit 31 determines DFT based on an input signal and a twiddle factor from the signal generating circuit 9 (step 201 in FIG. 4), while and the pattern detecting circuit 10 detects a clock component from the DFT results (step 105 in FIG. 4). The averaging filter 32 outputs phase information. The input signal in the first embodiment was a signal having a clock component. However, a signal having a clock component is not always input in view of the actual operation. For example, it is assumed that an input signal is $\{1, 1, 1, 1\}$ due to noises. Where DFT is performed in this case, the result of the one-symbol DFT is defined by the following expression (17).

$$\{0, 0\} \tag{17}$$

The averaging filters 7, 8 have the following outputs:

$$\{2(S-1), -2(S-1)\} \tag{18}$$

and, the amplitude becomes small as compared with the signal having a clock component.

Also, if the number of occurrences of the input signal becoming $\{1, 1, 1, 1\}$ increases, the averaging filter output has a smaller amplitude value. As a result, the averaging filter output tends to be affected easily by noises, degrading the accuracy of phase estimation.

Where an input signal $\{1, 1, 1, 1\}$ is entered, the one-symbol DFT results in $\{0, 0\}$. However, if an input signal is $\{0, 0, 0, 0\}$ or $\{-1, -1, -1, -1\}$, it does not have a clock component, and the one-symbol DFT results in $\{0, 0\}$.

The output from the DFT circuit 31 is then entered into the pattern detecting circuit 10. When the one-symbol DFT is $\{0, 0\}$ (step 106 in FIG. 4), the pattern detecting circuit 10 judges that the input signal does not have a clock component, halts the operation of the subsequent averaging filter 32 to prevent averaging, and outputs the averaged results on the previous symbol (step 107 in FIG. 4). If the one-symbol DFT does not result in $\{0, 0\}$, i.e., it has a clock component, the averaging filter 32 resumes operation (step 103 in FIG. 4).

As described above, if the pattern detecting circuit 10 detects a pattern not having a clock component in the DFT result, it halts the operation of the averaging filter 32 to prevent averaging. Therefore, energy reduction of the averaging filter 32 can be prevented, while degradation of the accuracy of phase estimation can also be suppressed.

Although in the description above, DFT was performed on a single symbol basis, it may also be performed in units of several symbols. The pattern detecting circuit 10 may also perform processing in the same several symbol units.

Also, although the described input signal had three amplitudes, −1, 0 and 1, the number of quantizing bits of the amplitude may be increased. In this case, the pattern detecting circuit 10 halts the operation of the averaging filter 32 when the DFT result is smaller than a predetermined value.

Embodiment 3

Figure 5:
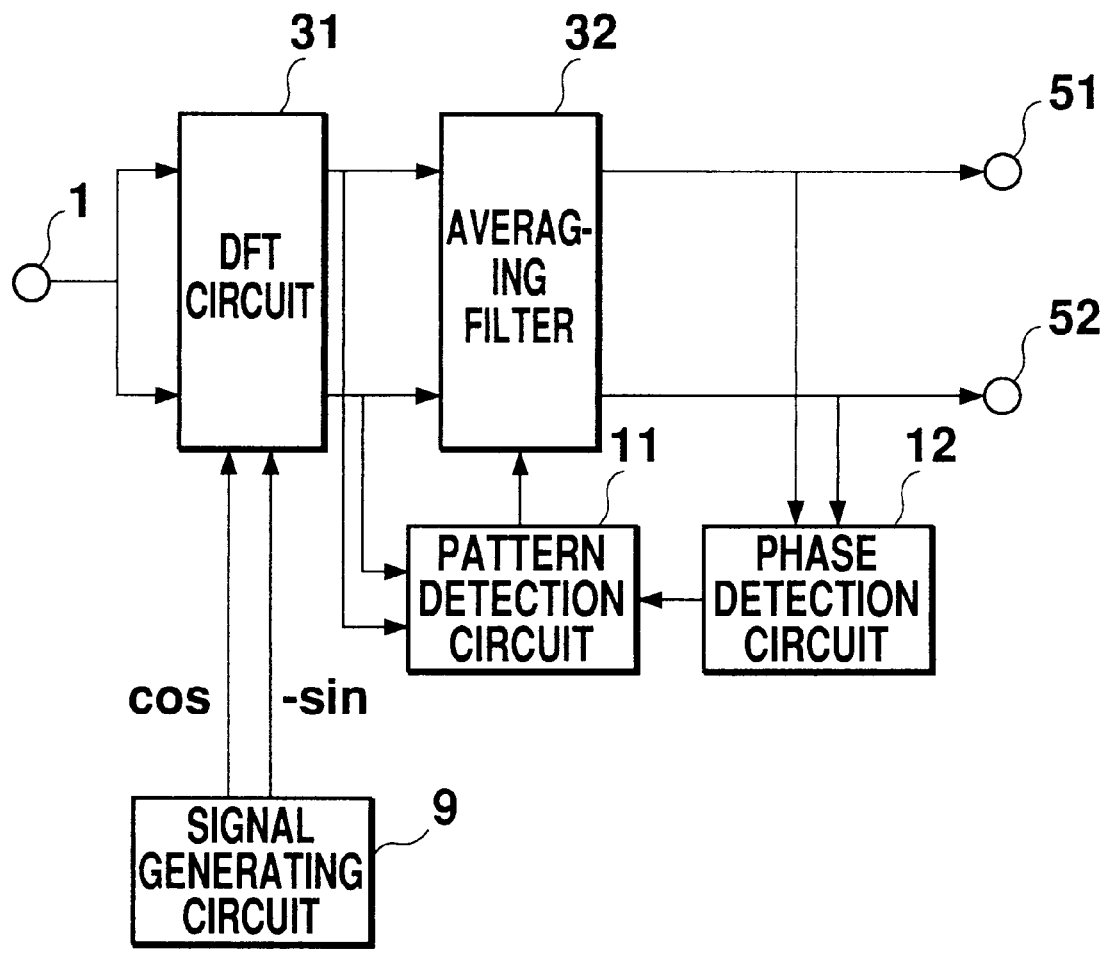
FIG. 5 is a block diagram showing a phase estimating circuit according to a third embodiment of the invention.
Figure 6:
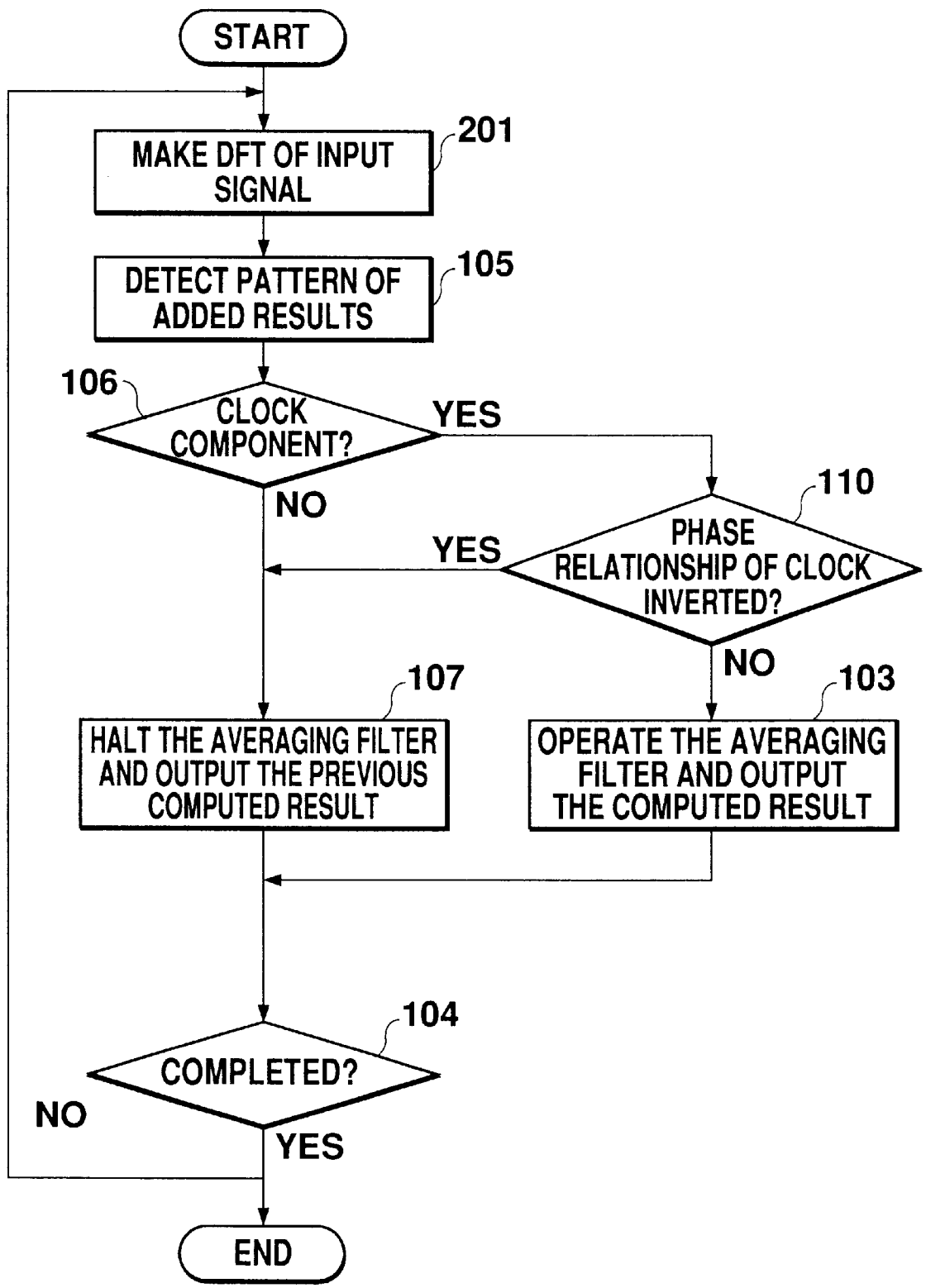
FIG. 6 is a flowchart showing the operation of the phase estimating circuit according to the third embodiment of the invention.

FIG. 5 is a block diagram showing a phase estimating circuit according to a third aspect of the present invention. FIG. 6 is a flowchart showing the operation of the phase estimating circuit of the third aspect of the invention.

In FIG. 5, reference numeral 12 denotes a phase detecting circuit which determines the phase of a clock based on the output from an averaging filter 32.

Reference numeral 11 denotes a pattern detecting circuit, which refers to the DFT result output from a DFT circuit 31 and the phase information from the phase detecting circuit 12, and stops the operation of the averaging filter 32 when there is a pattern to reduce a clock component.

An input terminal 1, a signal generating circuit 9, an output terminal 51, an output terminal 52, the DFT circuit 31 and the averaging filter 32 correspond to those described in the first embodiment.

The operation will next be described with reference to FIG. 5 and FIG. 6.

As in the second embodiment, the DFT circuit 31 determines DFT based on an input signal and a twiddle factor from the signal generating circuit 9 (step 201 in FIG. 6), and the pattern detecting circuit 10 detects a clock component from the DFT results (step 105 in FIG. 6). The averaging filter 32 outputs phase information.

The pattern detecting circuit 11 detects the one-symbol DFT results {0, 0} and stops the operation of the averaging filter in the same way as in the second embodiment. In addition, description will be made of the input signal which is assumed to be a signal having a clock component corresponding to an inverse clock. In the first embodiment, the input signal having a clock component was a repetition signal {1, 1, −1, −1}. In the third embodiment, it is assumed that an inverse signal {−1, −1, 1, 1} is input at a predetermined time. The one-symbol DFT results are as:

$$\{-2, 2\} \qquad (19)$$

The averaging filter 32 then outputs:

$$\{2(S-2), -2(S-2)\} \qquad (20)$$

Energy of the averaging filter 32 is defined by the following expression (21).

$$4(S-2)^2 \qquad (21)$$

Therefore, the energy becomes lower than when the signal not comprising a clock component was entered.

The pattern detecting circuit 11 compares the result of the one-symbol DFT with the output, namely phase information, from the averaging filter 32 (step 110 in FIG. 6), halts the operation of the averaging filter 32 when their phase relationship is inverted, and outputs the previously computed result (step 107 in FIG. 6).

If their phase relationship is not inverted, the averaging filter 32 is operated to output the computed result.

For example, it will be judged that the phase of a clock component has inverted when the averaging filter outputs {2S, −2S} and the one-symbol DFT results in {−2, 2} in the above case. Therefore, when the phase of the clock component of the input signal is inverted from the phase of the clock which was determined up to the previous symbol by one, the operation of the averaging filter 32 is stopped, and the previous computed result is output.

As described above, the one-symbol DFT result is compared with the phase information, and, if their phase relationship is inverted, the operation of the averaging filter 32 is halt, and the previous computed result is output. Thus, degradation in accuracy of phase estimation can be prevented.

Although an inverted phase relationship between the one-symbol DFT result and the phase information was described above, these components may also have a predetermined phase difference.

DFT was performed on a single symbol basis in the above embodiment but may also be performed in units of the same several symbols.

Also, although in the description, the input signal had three amplitudes, −1, 0 and 1, the number of quantizing bits of the amplitudes may be increased. In this case, the pattern detecting circuit 10 halts the operation of the averaging filter 32 when the DFT result has a pattern corresponding to a value smaller than a predetermined clock component.

Embodiment 4

Figure 7:
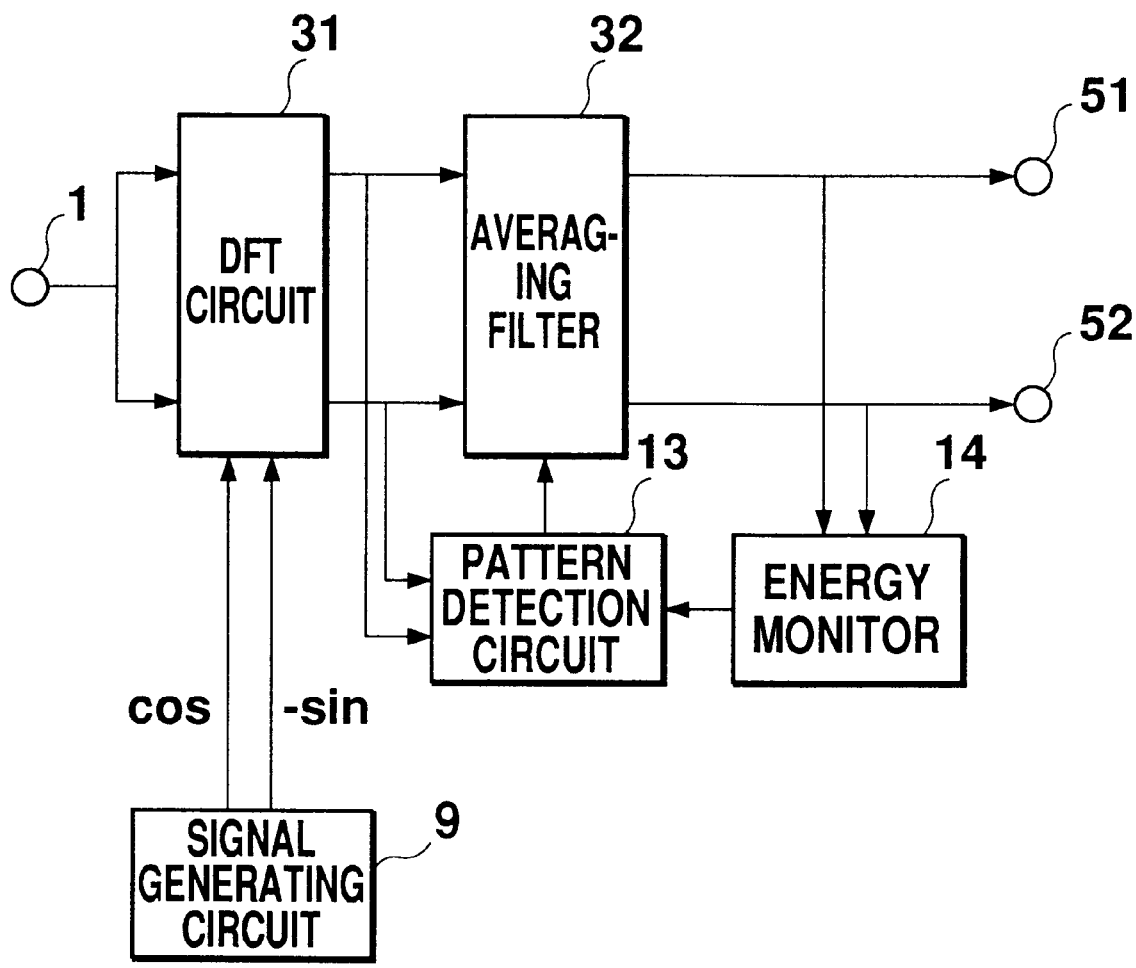
FIG. 7 is a block diagram showing a phase estimating circuit according to a fourth embodiment of the invention.
Figure 8:
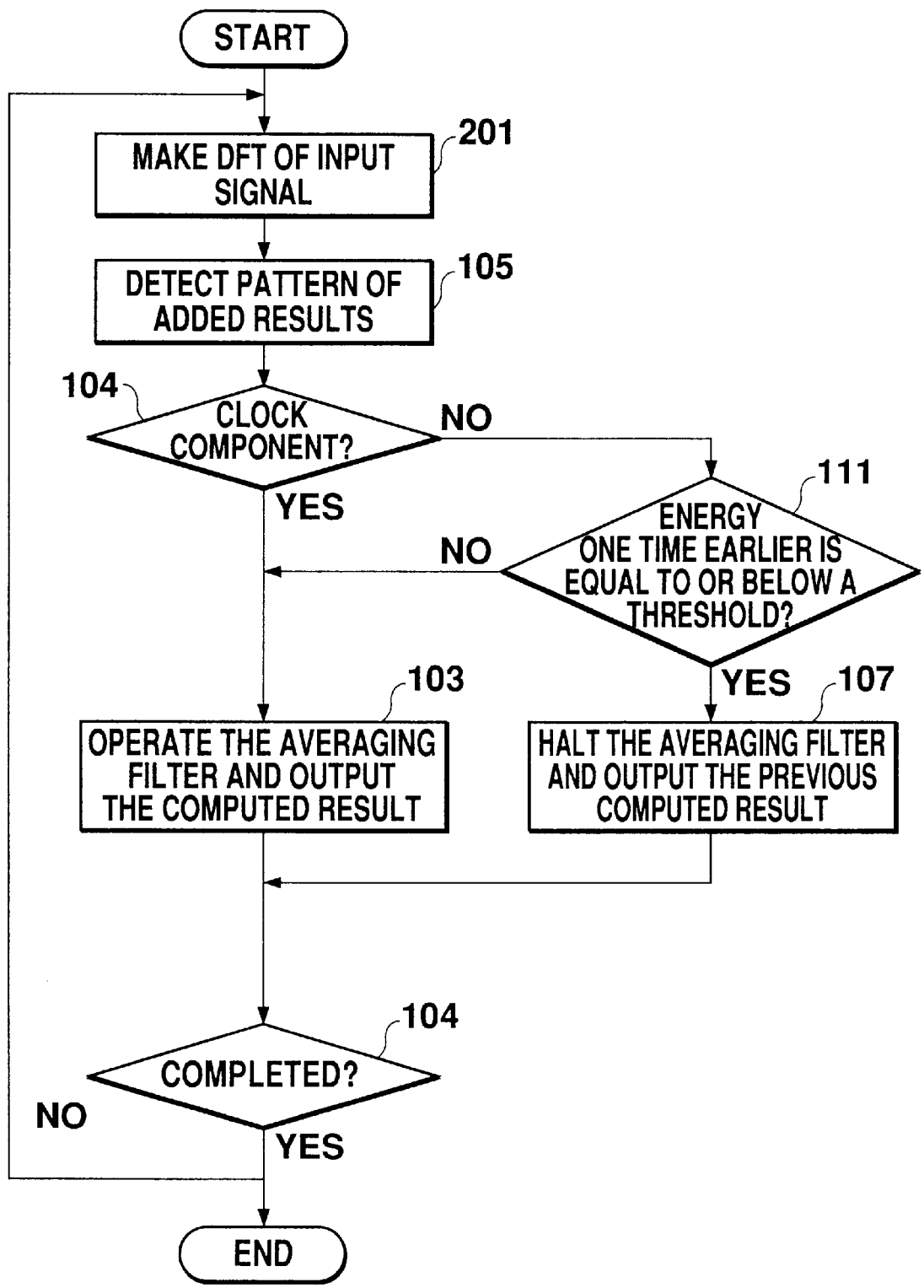
FIG. 8 is a flowchart showing the operation of the phase estimating circuit according to the fourth embodiment of the invention.

FIG. 7 is a block diagram of a phase estimating circuit according to a fourth aspect of the present invention. FIG. 8 is a flowchart showing the operation of the phase estimating circuit of the fourth aspect of the invention. In FIG. 7, reference numeral 14 denotes an energy monitor, which determines the energy of an averaged clock component in view of the output from an averaging filter 32, compares the determined energy with a threshold, and outputs a signal to turn ON or OFF the averaging filter 32 according to the comparison result.

Reference numeral 13 denotes a pattern detecting circuit, which combines the ON/OFF signal from the energy monitor with the result of the pattern detection by the method described in the second embodiment to turn ON/OFF the averaging filter 32.

An input terminal 1, a signal generating circuit 9, an output terminal 51, an output terminal 52, a DFT circuit 31 and the averaging filter 32 correspond to those described for the first embodiment.

The operation will next be described with reference to FIG. 7 and FIG. 8.

Similar to the second embodiment, the DFT circuit 31 determines DFT in view of an input signal and a twiddle factor from the signal generating circuit 9 (step 201 in FIG. 8), and the pattern detecting circuit 13 detects a clock component from the DFT results (step 105 in FIG. 8). The averaging filter 32 outputs phase information.

When the one-symbol DFT results in {0, 0}, it is judged that the input signal not having a clock component is entered, and the operation of the averaging filter 32 is halted. Also, if adder 5 and adder 6 output 0 for one symbol, the output from the averaging filter 32 is:

$$\{2(S-1), -2(S-1)\} \qquad (22)$$

and the energy (power) of the averaging filter 32 is given by the following expression (23).

$$4(S-1)^2 \qquad (23)$$

As compared with a case that all input signals have a clock component, the energy is lowered to the following.

$$(S-1)^2/S^2 = (1-1/S)^2 \qquad (24)$$

However, if the number of averaging symbols (S) is large, it is given by the following equation (25).

$$(1-1/S)^2 \approx 1 \qquad (25)$$

Therefore, there is substantially no effect as compared with a the case that all input signals have a clock component.

Accordingly, the energy monitor 14 monitors the power from the averaging filter 32 (step 111 in FIG. 8), and, when the energy lowers to a predetermined value or below, outputs a signal for turning off the averaging filter 32 to the pattern detecting circuit 13 (step 107 in FIG. 8). In the pattern detecting circuit 13, the operation of the averaging filter 32 is stopped when a signal outputted from the energy monitor is off and the pattern detecting circuit 13 receives a signal not having a clock component as the input signal.

When the pattern detecting circuit 13 detects a clock component in the input signal (step 104 in FIG. 8), the averaging filter 32 is operated to output a computed result (step 103 in FIG. 8).

Thus, the accuracy of phase estimation can be maintained.

Although in the above description, DFT was performed on at single symbol basis, DFT may also be performed in units of several symbols. DFT may also be performed in the same several symbol units in the pattern detecting circuit 13.

Also, although the input signal was described with three amplitudes, −1, 0 and 1, but the number of quantizing bits of the amplitudes may be increased. In this case, the operation of the averaging filter 32 is halted when the DFT result has a value smaller than a predetermined clock component.

Embodiment 5

Figure 9:
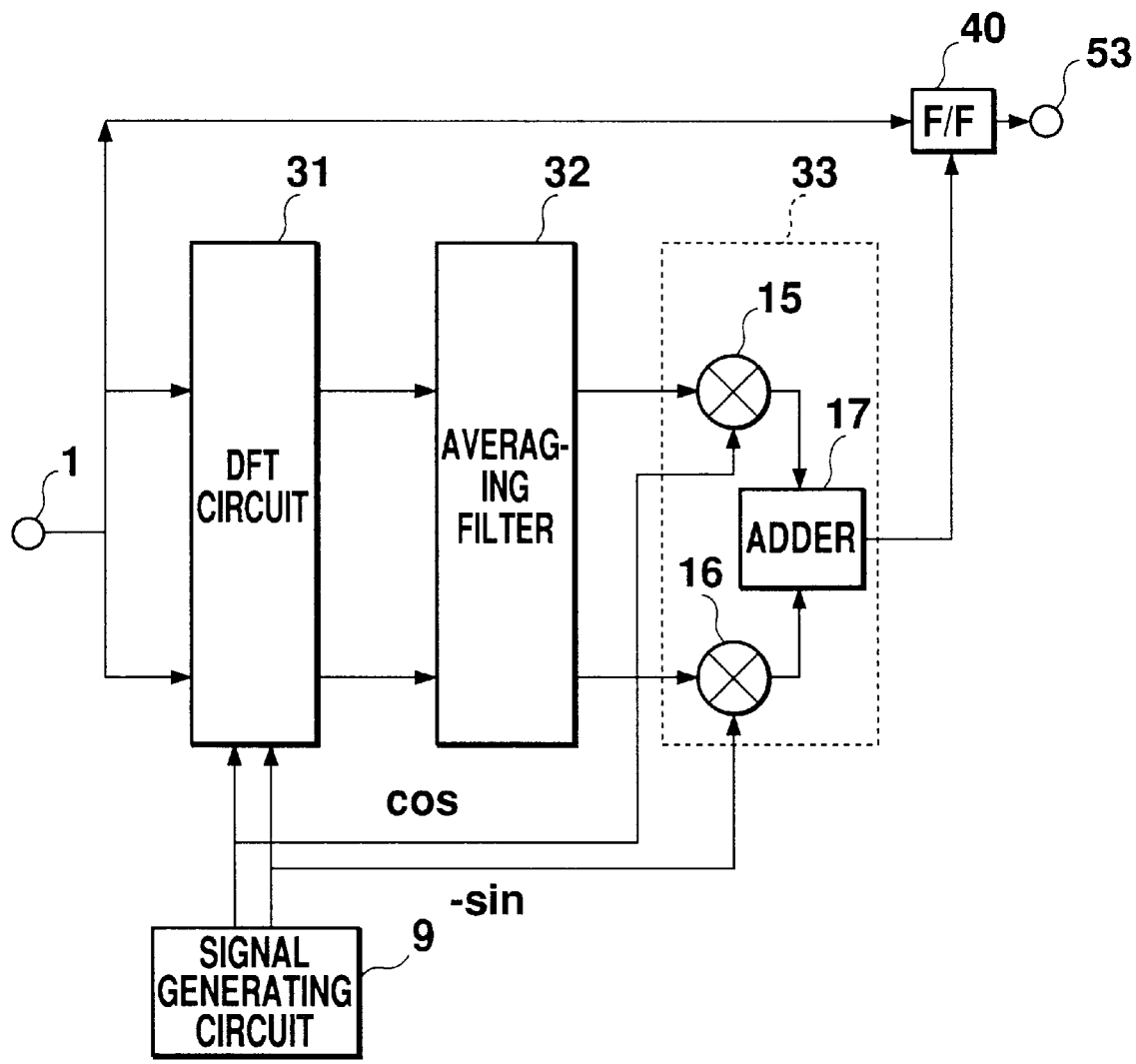
FIG. 9 is a block diagram showing a demodulating circuit according to a fifth embodiment of the invention.
Figure 10:
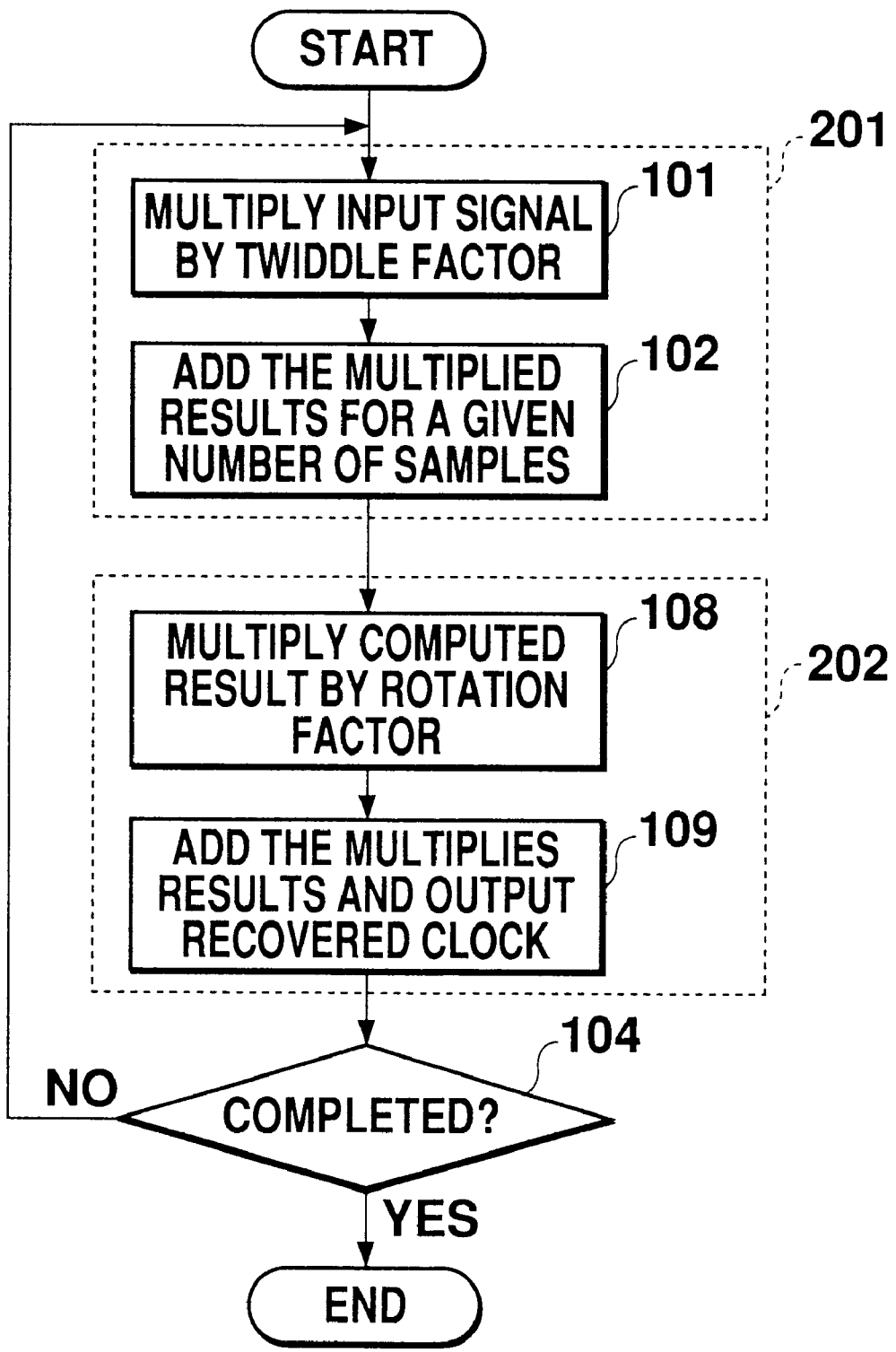
FIG. 10 is a flowchart showing the operation of the demodulating circuit according to the fifth embodiment of the invention.

FIG. 9 is a block diagram showing a demodulating circuit according to a fifth embodiment of the present invention. FIG. 10 is a flowchart showing the operation of the demodulating circuit of the fifth embodiment of the invention.

The demodulating circuit shown in FIG. 9 comprises a phase estimating circuit according to the first embodiment.

In FIG. 9, reference numeral 33 denotes an inverse modulating circuit, which comprises a multiplier 15, a multiplier 16, and an adder 17. The multipliers 15, 16 multiply the output from an averaging filter 32 by the twiddle factor. The adder 17 adds the outputs from the multipliers 15, 16. Reference numeral 53 denotes an output terminal for outputting from the adder 17.

Reference numeral 40 denotes a flip-flop for determining demodulation data in view of the input signal according to a recovered clock.

The remaining components correspond to those of the first embodiment shown in FIG. 1, and the phase estimating circuit comprises an input terminal 1, a signal generating circuit 9, a DFT circuit 31 and the averaging filter 32.

The operation of this circuit will next be described.

The DFT circuit 31 determines DFT in view of an input signal and a twiddle factor from the signal generating circuit 9 (step 101 in FIG. 10), and the averaging filter 32 outputs phase information (step 102 in FIG. 10). The inverse modulating circuit 33 generates a recovered clock in view of the phase information (steps 107, 108 in FIG. 10).

The recovered clock is prepared by inverse modulation (multiplying the determined phase information by the twiddle factor).

Specifically, for the inverse modulation shown in FIG. 9, the multiplier 15 and the multiplier 16 multiply the twiddle factor and the phase information output from the averaging filter 32 (step 107 in FIG. 10), and the multiplied results are added by the adder 15 (step 108 in FIG. 10). The output from the adder results from alternately selecting the output from the multiplier 15 and that from the multiplier 16 and adding a code of the input signal in conformity with a code of the twiddle factor. Therefore, if the averaging filter's output is given by the expression (16), a recovered clock is defined by the following expression (26).

$$\{2S, 2S, -2S, -2S\} \quad (26)$$

In view of the generated clock and the input signal, the flip-flop 40 reproduces and outputs demodulation data.

The above embodiment was described with reference to the phase estimating circuit of the first embodiment. However, the same demodulating circuit can be configured by the phase estimating circuits of the second to fourth embodiments based on the phase information output.

Embodiment 6

Figure 11:
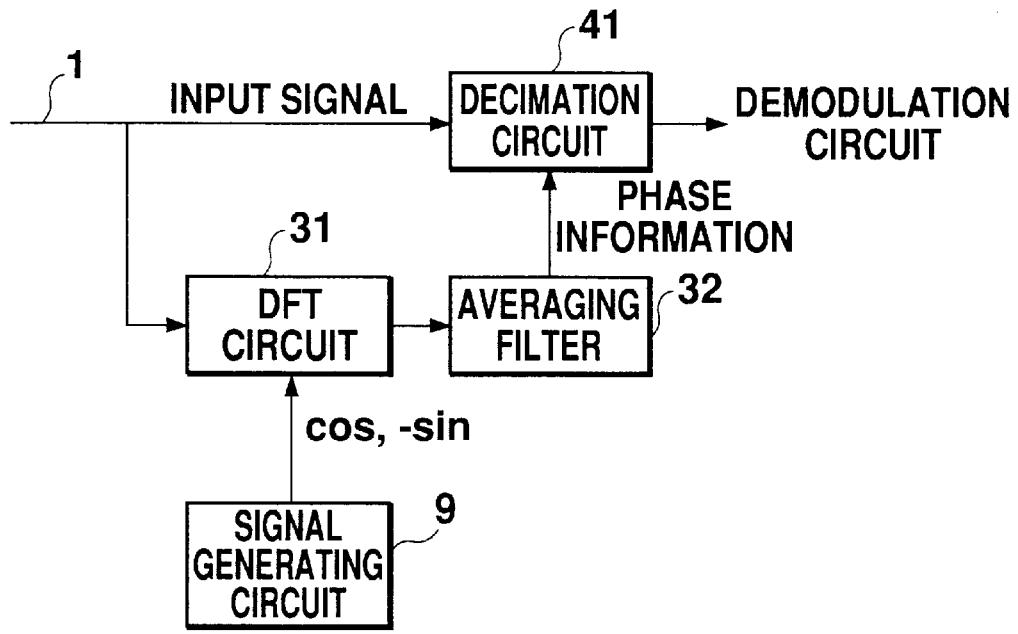
FIG. 11 is a block diagram showing a demodulating circuit according to the sixth embodiment except that it is configured of S/W.
Figure 12:
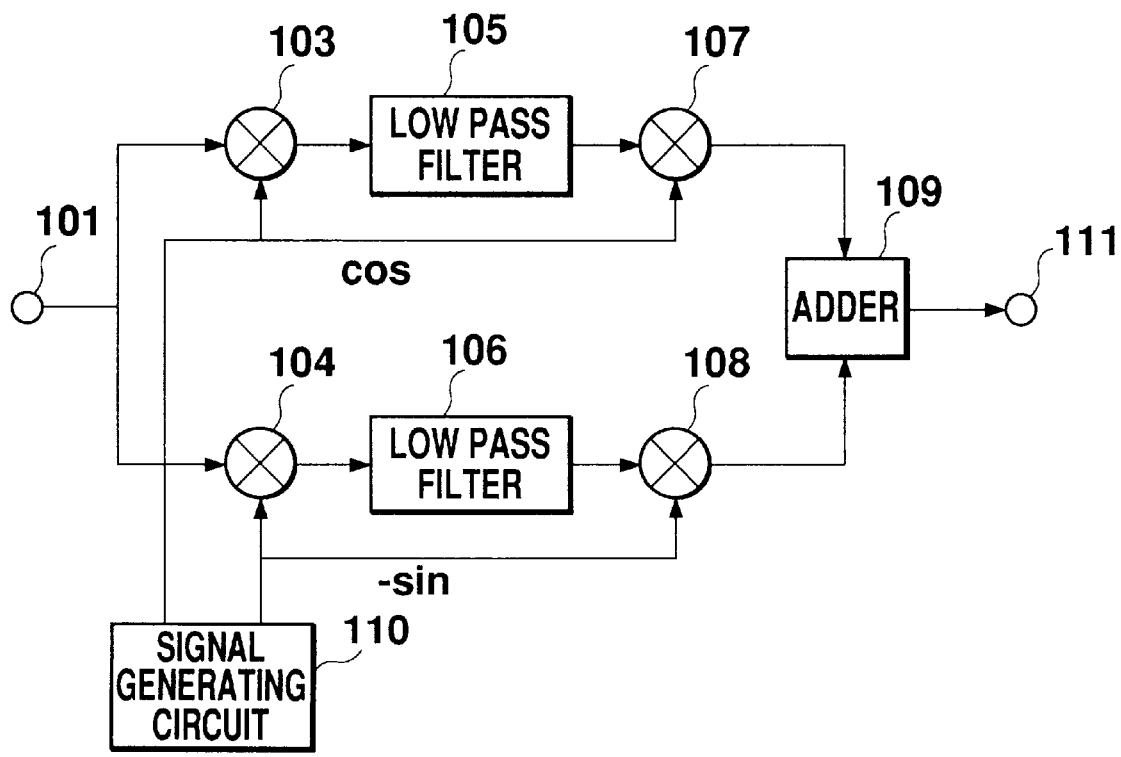
FIG. 12 is a block diagram showing a conventional demodulating circuit.
Figure 13:
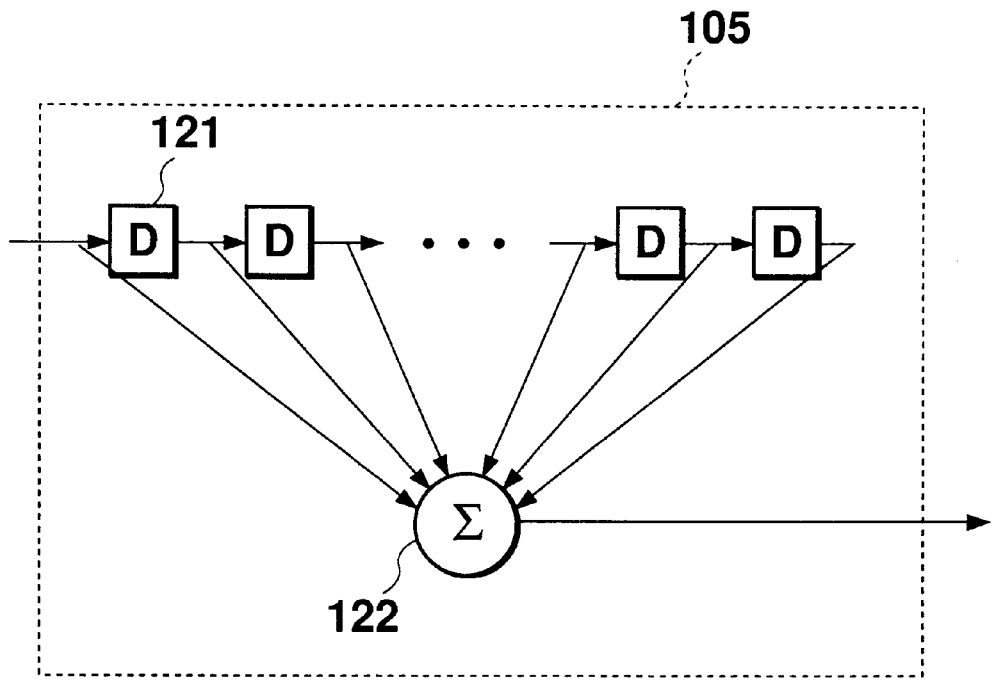
FIG. 13 is a diagram showing a first example of a low pass filter.
Figure 14:
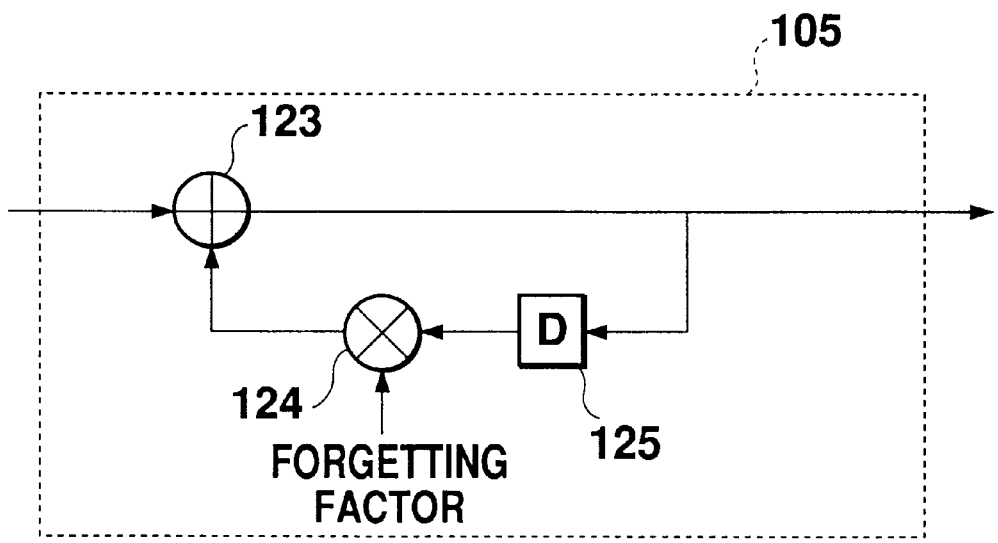
FIG. 14 is a diagram showing a second example of a low pass filter.

FIG. 11 shows an embodiment in which a demodulating circuit is configured using the phase estimating circuits of the first to fourth embodiments and their estimating circuits are controlled by software.

In FIG. 11, reference numeral 41 denotes a decimation circuit, and the remaining components are the same as those in the first embodiment shown in FIG. 1. Namely, a phase estimating circuit comprises a signal generating circuit 9, a DFT circuit 31 and an averaging filter 32.

The operation of this embodiment will next be described.

The phase estimating circuit determines phase information of an input signal entered from an input terminal 1 and decimates data on the input signal based on the determined phase information to output demodulation data.

Although the above description references the phase estimating circuit of the first embodiment, the same demodulating circuit can be configured using the phase estimating circuits of any one of the second to fourth embodiments based on the phase information output.

As described above, the demodulating circuit can be configured using only software if phase information corresponding to demodulating data is available. Because a recovered clock can be omitted, the demodulating circuit can be simplified as shown in the block diagram of FIG. 11.

As described above, the first aspect of the invention performs filtering of the result obtained by the discrete Fourier transform performed on a symbol basis, so that the accuracy of phase estimation is improved as compared with a conventional method.

The second aspect of the invention stops the operation of the averaging filter if a clock component is not many as a result of the discrete Fourier transform performed on an input signal on a symbol basis, so that energy of the averaging filter can be prevented from lowering, and an effect of noises can be suppressed. Thus, the accuracy of phase estimation can be improved.

The third aspect of the invention compares the output resulting from the discrete Fourier transform of an input signal performed on a symbol basis with the phase information output from the averaging filter and halts the operation of the averaging filter based on the compared result. Thus, the accuracy of phase estimation is improved.

The fourth aspect of the invention monitors the energy of the averaging filter and stops the operation of the averaging filter based on the result of the pattern detection and that of the energy monitoring, so that the accuracy of phase estimation is improved.

The fifth aspect of the invention can recover a recovered clock by the inverse modulation of phase information from the phase estimating circuit to obtain demodulation data of an input signal.

The sixth aspect of the invention can decimate an input signal based on the phase information from the phase estimating circuit to obtain demodulation data of the input signal.

While there have been described that what are at present considered to be preferred embodiments of the present invention, it is to be understood that various modifications may be made thereto, and it is intended that the appended claims cover all such modifications as fall within the true spirit and scope of the invention.

What is claimed is:

1. A phase estimating circuit for determining a phase component of a clock of an input signal, comprising:

a signal generating circuit for generating a twiddle factor signal for discrete Fourier transform having cos and −sin components;

a DFT circuit for performing a discrete Fourier transform for a predetermined number of symbols using the twiddle factor signal for the discrete Fourier transform and outputting the transformed result; and an averaging filter for averaging the results of the discrete Fourier transform output from the DFT circuit to output averaged phase information.

2. The phase estimating circuit according to claim 1, further comprising a pattern detecting circuit, which stops the operation of the averaging filter when the result of the discrete Fourier transform output from the DFT circuit includes a predetermined pattern.

3. The phase estimating circuit according to claim 2, further comprising a phase detecting circuit, which determines a phase of the clock component of the input signal up to the previous symbol in view of the output from the averaging filter, outputs the obtained result as phase information to the pattern detecting circuit, and halts the operation of the averaging filter according to the result of the discrete Fourier transform performed by the DFT circuit and the phase information from the phase detecting circuit.

4. The phase estimating circuit according to claim 2, further comprising an energy monitor, which determines energy of the clock component in view of the output from the averaging filter, compares the determined energy with a predetermined threshold, and outputs the compared result, and wherein:

the pattern detecting circuit halts the operation of the averaging filter according to the output resulting from the discrete Fourier transform performed by the DFT circuit and the output from the energy monitor.

5. A demodulating circuit comprising:

a phase estimating circuit which includes:

a signal generating circuit for generating a twiddle factor signal for a discrete Fourier transform having cos and −sin components;

a DFT circuit for performing a discrete Fourier transform for a predetermined number of symbols using the twiddle factor signal and outputting the transformed result; and an averaging filter for averaging the output of the DFT circuit to obtain averaged phase information;

an inverse modulating circuit which generates a recovered clock based on phase information output from the phase estimating circuit and a twiddle factor for the discrete Fourier transform output from the signal generating circuit; and a decision circuit which judges the input signal using the recovered clock.

6. A demodulating circuit according to claim 5, wherein the phase estimating circuit further comprises: a pattern detecting circuit, which stops operation of the averaging filter when the result of the DFT includes a predetermined pattern.

7. A demodulating circuit according to claim 6, wherein the phase estimating circuit further comprises: a phase detecting circuit, which determines a phase of the clock component of the input signal up to the previous symbol in view of the output of the averaging filter, outputs the phase determination to the pattern detecting circuit, and halts the operation of the averaging filter according to the DFT result and the phase information from the phase detecting circuit.

8. A demodulating circuit according to claim 5, wherein the phase estimating circuit further comprises:

an energy monitor which determines the energy of the clock component based on the output of the averaging filter, compares the determined energy with a predetermined threshold, and outputs the comparison result, wherein the pattern detecting circuit halts the operation of the averaging filter based on the discrete Fourier transform result and the output of the energy monitor.

9. A demodulating circuit comprising:

a phase estimating circuit which includes:

a signal generating circuit for generating a twiddle factor signal for a discrete Fourier transform having cos and −sin components;

a DFT circuit for performing a DFT for a predetermined number of symbols using the twiddle factor signal and outputting the transformed result; and an averaging filter for averaging the output of the DFT circuit to obtain averaged phase information; and a decimation circuit, which decimates data of the input signal based on phase information output from the phase estimating circuit and outputs demodulation data.

10. A demodulating circuit according to claim 9, wherein the phase estimating circuit further comprises: a pattern detecting circuit, which stops operation of the averaging filter when the result of the discrete Fourier transform includes a predetermined pattern.

11. A demodulating circuit according to claim 9, wherein the phase estimating circuit further comprises: a phase detecting circuit, which determines a phase of the clock component of the input signal up to the previous symbol in view of the output of the averaging filter, outputs the phase determination to the pattern detecting circuit, and halts the operation of the averaging filter according to the discrete Fourier transform result and the phase information from the phase detecting circuit.

12. A demodulating circuit according to claim 9, wherein the phase estimating circuit further comprises:

an energy monitor which determines the energy of the clock component based on the output of the averaging filter, compares the determined energy with a predetermined threshold, and outputs the comparison result, wherein the pattern detecting circuit halts the operation of the averaging filter based on the DFT result and the output of the energy monitor.

13. A method for determining a clock phase component of an input signal comprising:

generating a twiddle factor signal, having cos and −sin components, for discrete Fourier transform;

performing a discrete Fourier transform for a predetermined number of symbols using the twiddle factor signal, and outputting the transform result;

averaging the results of the discrete Fourier transform to obtain averaged phase information.

14. The method according to claim 13, further comprising:

stopping the averaging step when the result of the discrete Fourier transform includes a predetermined pattern.

15. A method according to claim 14, further comprising:

determining a phase of the clock component of the input signal up to a preceding symbol based on the result of said averaging step;

outputting the result of said determining step as phase information to be used to detect said predetermined pattern; and halting said averaging step based on the result of the discrete Fourier transform step and the phase information obtained in said determining step.

16. A method according to claim 14, further comprising:

monitoring an energy level of the clock component based on the output of said averaging step; and comparing the energy level with a predetermined threshold;

wherein said stopping step stops the averaging step based on the discrete Fourier transform result and the result of said comparing step.

* * * * *